United States Patent
Calendrille, Jr. et al.

(10) Patent No.: US 11,279,437 B2
(45) Date of Patent: Mar. 22, 2022

(54) SHIFT OPERATING DEVICE

(71) Applicant: TEKTRO TECHNOLOGY CORPORATION, Changhua County (TW)

(72) Inventors: John L. Calendrille, Jr., Port Jefferson, NY (US); Chung-Sheng Tsai, Changhua County (TW)

(73) Assignee: TEKTRO TECHNOLOGY CORPORATION, Changhua County (TW)

(*) Notice: Subject to any disclaimer, the term of this patent is extended or adjusted under 35 U.S.C. 154(b) by 0 days.

(21) Appl. No.: 17/246,992

(22) Filed: May 3, 2021

(65) Prior Publication Data

US 2021/0347436 A1  Nov. 11, 2021

(30) Foreign Application Priority Data

May 8, 2020 (TW) ................. 109115427

(51) Int. Cl.

| | |
|---|---|
| *B62K 23/06* | (2006.01) |
| *G05G 1/04* | (2006.01) |
| *B62M 25/04* | (2006.01) |
| *F16C 1/18* | (2006.01) |
| *G05G 1/01* | (2008.04) |
| *G05G 5/05* | (2006.01) |

(52) U.S. Cl.
CPC ............ *B62K 23/06* (2013.01); *B62M 25/04* (2013.01); *F16C 1/18* (2013.01); *G05G 1/01* (2013.01); *G05G 1/04* (2013.01); *G05G 5/05* (2013.01)

(58) Field of Classification Search
CPC .................................. F16C 1/18; G05G 1/01
See application file for complete search history.

(56) References Cited

U.S. PATENT DOCUMENTS

2005/0241429 A1* 11/2005 Kawakami ........... B62M 25/045
  74/502.2
2010/0037723 A1*  2/2010 Chiang .................... F16C 1/16
  74/502

* cited by examiner

*Primary Examiner* — Vicky A Johnson
(74) *Attorney, Agent, or Firm* — Locke Lord LLP; Tim Tingkang Xia, Esq.

(57) ABSTRACT

A shift operating device includes a frame body, a cable spool assembly, a first elastic component, an upshift lever, a driving pawl, a positioning pawl, a movable component, and a downshift lever. The cable spool assembly is disposed on the frame body. The first elastic component can force the cable spool assembly to rotate along a first direction. The upshift lever can rotate the cable spool assembly along a second direction by the driving pawl. The positioning pawl is disposed on the frame body and engaged with the cable spool assembly. The movable component is linearly and movably disposed on the frame body and in contact with the positioning pawl. The downshift lever is disposed on the frame body and in contact with the movable component. When the downshift lever is pivoted, the downshift lever forces the movable component to detach the positioning pawl from the cable spool assembly.

16 Claims, 10 Drawing Sheets

SHIFT OPERATING DEVICE

CROSS-REFERENCE TO RELATED APPLICATIONS

This non-provisional application claims priority under 35 U.S.C. § 119(a) on Patent Application No(s). 109115427 filed in Taiwan, R.O.C. on May 8, 2020, the entire contents of which are hereby incorporated by reference.

TECHNICAL FIELD

The disclosure relates to an operating device, more particularly to a shift operating device.

BACKGROUND

Outdoor cycling gives participants the chance to enjoy the scenes around while obtaining benefits of fitness, thus it has become more and more popular in the present society. In order to allow the bicycle to be suitable for traveling on different types of roads, there are sprockets, at least one derailleur, and at least one shift operating device disposed on the bicycle. The rider can operate the shift operating device to shift the bicycle chain from one sprocket to another via the derailleur.

The aforementioned shift operating device has an upshift lever and a downshift lever that are respectively used for performing the upshift and the downshift of the derailleur. In the present shift operation device, the upshift lever is a pivotable lever, and the downshift lever is a linear movable lever. However, in order to allow the linear movable downshift lever can be operated to downshift the derailleur, the arrangements of the components (e.g., the connection components, pushing components, springs, and so on) moved along with the downshift lever are complex, causing the expensive cost of the shift operating device. Therefore, how to reduce the cost of the shift operating device is one of crucial topics in this field.

SUMMARY OF THE INVENTION

The disclosure provides a shift operating device that can be manufactured in a cost-effective manner.

One embodiment of the disclosure provides a shift operating device. The shift operating device is configured to be mounted on a handlebar and to pull a bicycle cable. The shift operating device includes a frame body, a cable spool assembly, a first elastic component, an upshift lever, a driving pawl, a positioning pawl, a movable component, and a downshift lever. The cable spool assembly is rotatably disposed on the frame body. The cable spool assembly is configured for the bicycle cable to wind thereon. The first elastic component is disposed on the cable spool assembly. The first elastic component is configured to force the cable spool assembly to rotate along a first direction. The upshift lever is pivotably disposed on the frame body. The driving pawl is pivotably disposed on the upshift lever. When the upshift lever is pivoted, the upshift lever forces the cable spool assembly to rotate along a second direction opposite to the first direction via the driving pawl. The positioning pawl is pivotably disposed on the frame body. The positioning pawl is removably engaged with the cable spool assembly. The movable component is linearly and movably disposed on the frame body. The movable component is in contact with the positioning pawl. The downshift lever is pivotably disposed on the frame body and in contact with the movable component. When the downshift lever is pivoted, the downshift lever forces the movable component to detach the positioning pawl from the cable spool assembly so as to force the first elastic component to rotate the cable spool assembly along the first direction.

According to the shift operating device as discussed in the above embodiment, the movable component can be linearly moved relative to the frame body and in contact with the positioning pawl, and the downshift lever is pivotably disposed on the frame body and in contact with the movable component, such that, when the downshift lever is being activated, the movable component moves the positioning pawl away from the cable spool assembly, causing the cable spool assembly to rotate along the first direction so as to downshift the derailleur. Therefore, the relationship among the downshift lever and other components moved along with the downshift lever is simplified, thereby reducing the cost of the shift operating device.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

Figure 1:
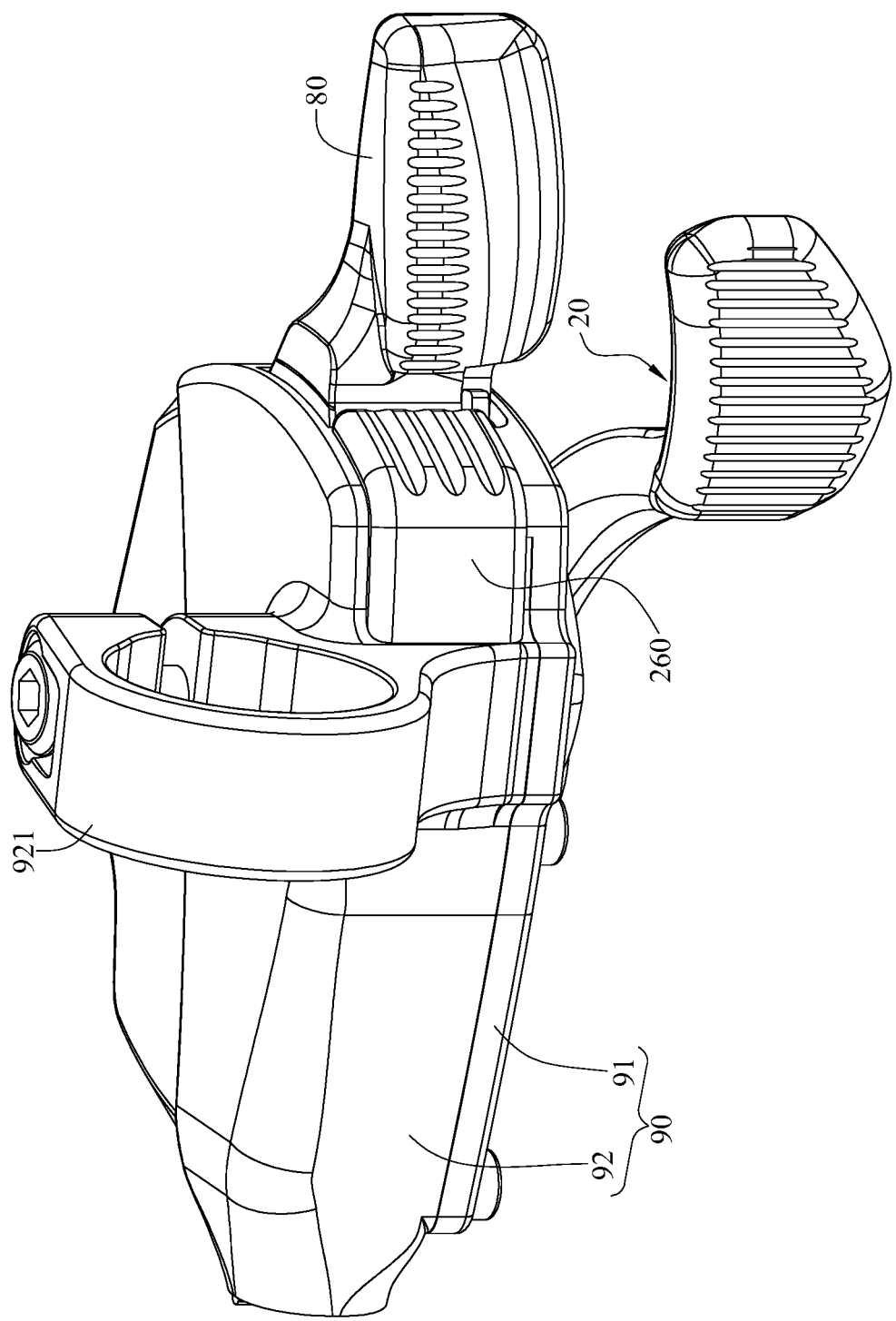
FIG. 1 is a perspective view of a shift operating device according to a first embodiment of the disclosure.
Figure 2:
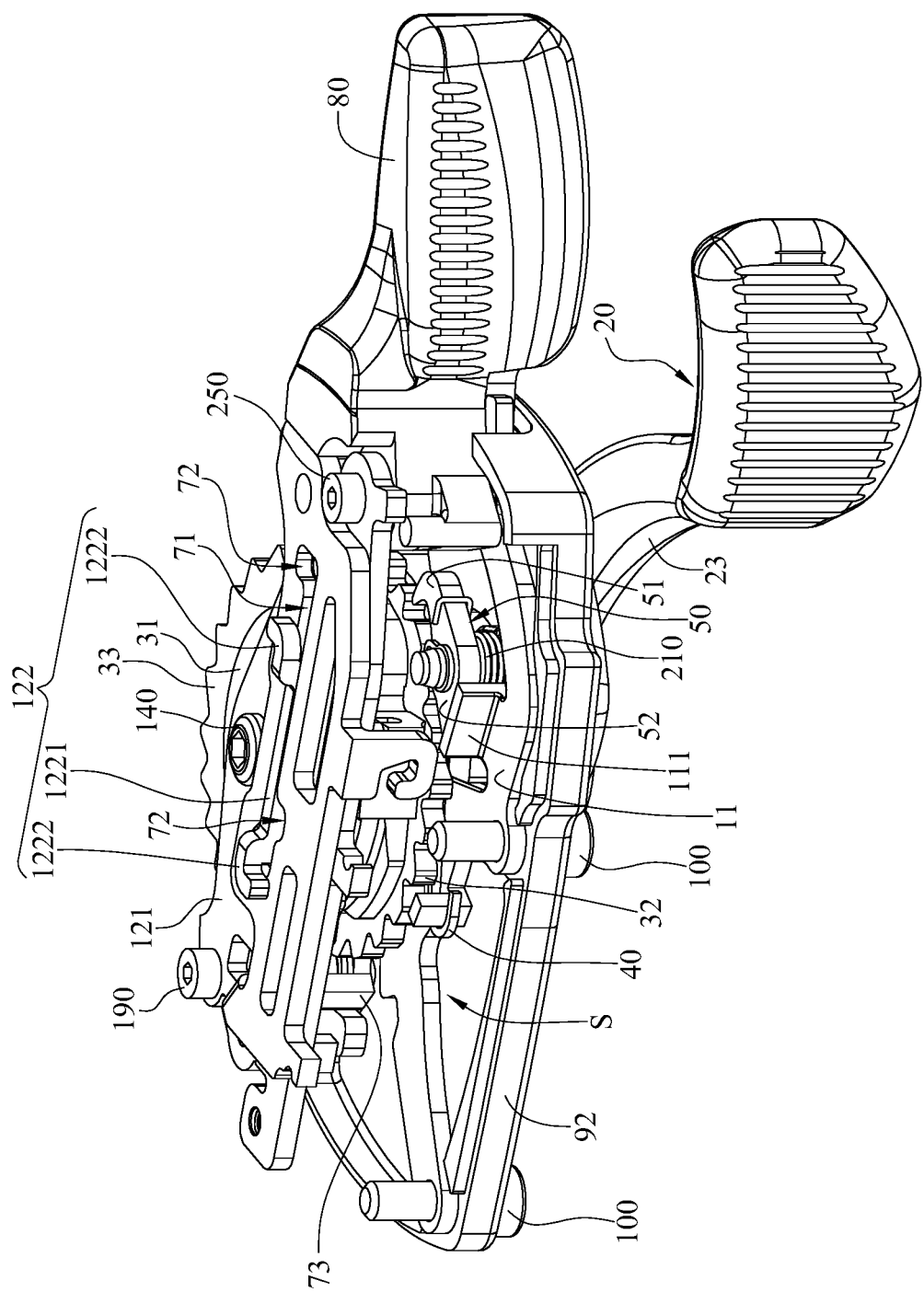
FIG. 2 is a perspective view of the shift operating device in FIG. 1 when an upper part of a casing and a cover are removed.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

In this disclosure, for the purpose of clear illustration and description, some figures may omit one or more components of the shift operating device. In addition, arrows shown in some figures are used to represent the movement direction of the component(s). Also, when different components are moved or rotated along the same direction, the same arrow can be used to represent the movement direction of such components.

Referring to FIGS. 1 to 5, there are shown a perspective view of a shift operating device 1, perspective views of the shift operating device 1 when an upper part 92 of a casing 90 and a cover 260 are removed, an exploded view of the shift operating device 1, and a cross-sectional view of the shift operating device 1.

In this embodiment, the shift operating device 1 includes a frame body 10, an upshift lever 20, a cable spool assembly 30, a first elastic component 40, a driving pawl 50, a positioning pawl 60, a movable component 70, and a downshift lever 80. In addition, in this or another embodiment, the shift operating device 1 may further include a casing 90.

The casing 90 includes a bottom part 91 and an upper part 92. The bottom part 91 and the upper part 92 are fixed to each other via screws 100. The bottom part 91 and the upper part 92 together define an accommodation space S therebetween. The bottom part 91 has a mount hole 911. The mount hole 911 is connected to the accommodation space S of the casing 90. The upshift lever 20 includes a mount portion 21, an extension portion 22, and a lever portion 23. The extension portion 22 and the lever portion 23 radially protrude outward from the mount portion 21. The mount portion 21 of the upshift lever 20 is disposed through the mount hole 911 of the bottom part 91, and the extension portion 22 and the lever portion 23 are respectively located inside and outside the accommodation space S of the casing 90.

In this embodiment, the mount portion 21 of the upshift lever 20 has a through hole 211, and the shift operating device 1 further includes a shaft assembly 110. The shaft assembly 110 includes a shaft 1101 and a screw 1102. The shaft 1101 is located in the through hole 211 of the mount portion 21 of the upshift lever 20, and the screw 1102 is disposed through the shaft 1101, and the screw 1102 is partially located in the accommodation space S of the casing 90.

The frame body 10 is located in the accommodation space S of the casing 90. The frame body 10 includes a bottom plate 11 and a top plate 12. The top plate 12 includes a plate portion 121. The bottom plate 11 is fixed to the bottom part 91 via the screws 100. The cable spool assembly 30 is located in the accommodation space S of the casing 90 and located between the bottom plate 11 and the plate portion 121 of the top plate 12. Specifically, the cable spool assembly 30 includes a cable holder 31, a first ratchet 32, and a second ratchet 33, and the shift operating device 1 further includes a shaft 130 and a screw 140. The cable holder 31 is stacked on the bottom plate 11. The first ratchet 32 and the second ratchet 33 are respectively fixed at two opposite sides of the cable holder 31, and the first ratchet 32 is located closer to the bottom plate 11 than the second ratchet 33. The cable holder 31 has a through hole 311. The shaft 130 is located in the through hole 311. The plate portion 121 of the top plate 12 of the frame body 10 is stacked on a side of the second ratchet 33 located away from the first ratchet 32. The screw 140 is disposed through the plate portion 121 of the top plate 12 and screwed into the shaft 130, such that the cable holder 31, the first ratchet 32, and the second ratchet 33 are located between and clamped by the plate portion 121 of the top plate 12 and the bottom plate 11. The portion of the screw 1102 of the shaft assembly 110 located in the accommodation space S of the casing 90 is screwed into the shaft 130, and the mount portion 21 and the lever portion 23 of the upshift lever 20 are positioned at a side of the bottom plate 11 located away from the cable spool assembly 30.

In this embodiment, the cable holder 31, the first ratchet 32, and the second ratchet 33 can be rotated together relative to the bottom plate 11 and the top plate 12 of the frame body 10 via the shaft 130, and the upshift lever 20 can be rotated relative to the bottom plate 11 of the frame body 10 via the shaft 1101 of the shaft assembly 110.

Figure 5:
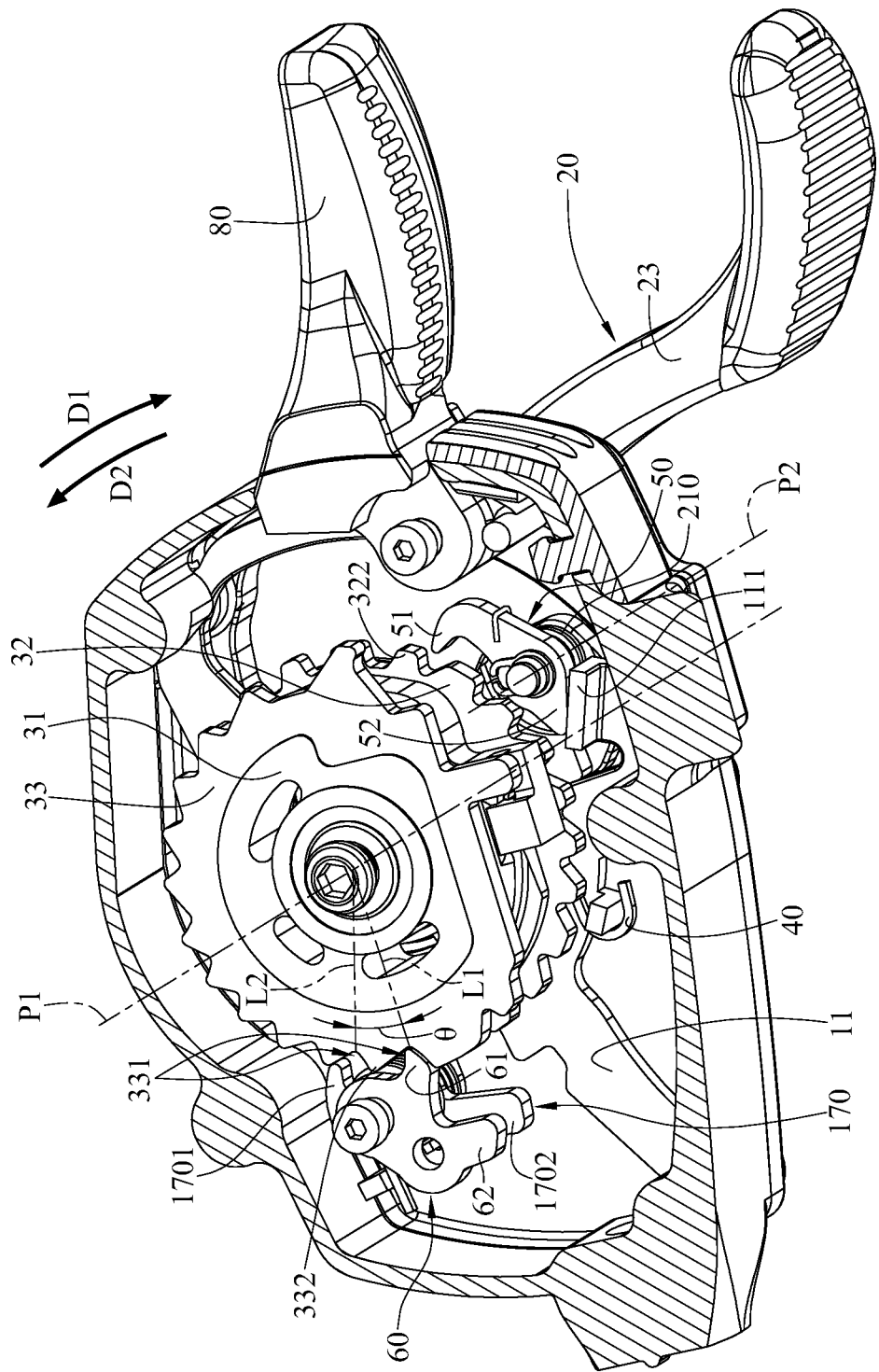
FIG. 5 is a cross-sectional view of the shift operating device in FIG. 1.

The first ratchet 32 has a plurality of grooves 321 and a plurality of teeth 322. Every two adjacent teeth 322 are spaced apart by one groove 321. Similarly, the second ratchet 33 also has a plurality of grooves 331 and a plurality of teeth 332. Every two adjacent teeth 332 are spaced apart by one groove 331. As shown in FIG. 5, there is an angle θ formed between two lines L1 and L2 that respectively connects the bottoms of every two adjacent grooves 331 with a rotation axis P1 of the second ratchet 33; in other words, θ denotes an angle between every two root surfaces, where the root surface is the surface located at the bottom of each groove 331.

In this embodiment, the cable holder 31 is configured for the fixation of one end of a bicycle cable (not shown), and the other end of the bicycle cable is configured to be connected to a bicycle derailleur (not shown), such as a rear derailleur. When the cable spool assembly 30 is rotated along a first direction D1, the cable spool assembly 30 loosens the bicycle cable for the downshift of the bicycle derailleur; specifically, after the second ratchet 33 is rotated by one angle θ along the first direction D1, the bicycle derailleur is downshifted one gear. When the cable spool assembly 30 is rotated along a second direction D2 opposite to the first direction D1, the cable spool assembly 30 pulls the bicycle cable for the upshift of the bicycle derailleur; specifically, after the second ratchet 33 is rotated by one angle θ along the second direction D2, the bicycle derailleur is upshifted one gear.

The first elastic component 40 is, for example, a torsion spring. The first elastic component 40 is located between the first ratchet 32 and the bottom plate 11, and two opposite ends of the first elastic component 40 are respectively fixed to the bottom plate 11 and the cable holder 31. The first elastic component 40 is configured to force the cable spool assembly 30 to rotate along the first direction D1. In addition, the shift operating device 1 further includes a second elastic component 150. The second elastic component 150 is, for example, a torsion spring. The second elastic component 150 is located between the bottom plate 11 and the mount portion 21 of the upshift lever 20, and two opposite ends of the second elastic component 150 are respectively fixed to the bottom plate 11 and the mount portion 21. The second elastic component 150 is configured to force the upshift lever 20 to pivot along the first direction D1.

The extension portion 22 of the upshift lever 20 has a pillar part 221. The driving pawl 50 is pivotably disposed on the pillar part 221 of the extension portion 22, and the driving pawl 50 is positioned by a clip 160 mounted on the pillar part 221 so as to be held on the pillar part 221. The bottom plate 11 has a contact portion 111 extending towards the plate portion 121 of the top plate 12, and the driving pawl 50 has an engagement portion 51 and a contact portion 52. The engagement portion 51 and the contact portion 52 are respectively located at two opposite sides of a pivot axis P2 of the driving pawl 50, and the engagement portion 51 and the contact portion 52 respectively correspond to the first ratchet 32 and the contact portion 111 of the bottom plate 11. As shown in FIG. 5, the driving pawl 50 is disposed on the upshift lever 20, and the end of the second elastic component 150 is fixed to the upshift lever 20, such that the second elastic component 150 also can force the driving pawl 50 to move along the first direction D1. Therefore, when the upshift lever 20 is yet not pivoted, the second elastic component 150 keeps the contact portion 52 of the driving pawl 50 to contact the contact portion 111 of the bottom plate 11 so as to make the engagement portion 51 of the driving pawl 50 separate from the first ratchet 32.

In this embodiment, the shift operating device 1 further includes a stopping pawl 170. The positioning pawl 60 and the stopping pawl 170 are pivotably disposed on and located between the bottom plate 11 and the plate portion 121 of the top plate 12 of the frame body 10. In detail, the shift operating device 1 further includes a shaft 180, a screw 190, and a sleeve 200. Two opposite ends of the shaft 180 are respectively mounted on the bottom plate 11 and the plate portion 121 of the top plate 12, and the screw 190 is disposed through the plate portion 121 of the top plate 12 and screwed into the shaft 180. The positioning pawl 60, the stopping pawl 170, and the sleeve 200 are respectively sleeved on the shaft 180. The sleeve 200 is located between the positioning pawl 60 and the stopping pawl 170, and the stopping pawl 170 is located closer to the bottom plate 11 of the frame body 10 than the positioning pawl 60.

In this embodiment, the shift operating device 1 further includes a plurality of second elastic components 210, 220, and 230. In addition, the bottom plate 11 of the frame body 10 has another contact portion 112 extending towards the plate portion 121 of the top plate 12. The positioning pawl 60 has an engagement portion 61, a pushed portion 62, and a through hole 63, and the stopping pawl 170 has an engagement portion 1701 and a pushed portion 1702. The engagement portion 61 and the pushed portion 62 of the positioning pawl 60 respectively extend towards two different directions. The engagement portion 1701 and the pushed portion 1702 of the stopping pawl 170 are respectively located two opposite sides of a pivot axis P3 of the stopping pawl 170.

The second elastic component 210 is, for example, a torsion spring. The second elastic component 210 is sleeved on the pillar part 221 of the extension portion 22, and the second elastic component 210 has one end fixed to the extension portion 22 and the other end press against the engagement portion 51 of the driving pawl 50. The second elastic component 210 is configured to force the engagement portion 51 of the driving pawl 50 to move towards the first ratchet 32.

The second elastic component 220 is sleeved on the sleeve 200, and the second elastic component 220 has one end inserted into the through hole 63 of the positioning pawl 60 and pressing against the inner surface of the through hole 63 and the other end in contact with the contact portion 112 of the bottom plate 11. The second elastic component 220 is configured to force the engagement portion 61 of the positioning pawl 60 to move towards the second ratchet 33. The second elastic component 220 keeps the engagement portion 61 of the positioning pawl 60 to engage with the groove 331 of the second ratchet 33 when there is no additional force applying on the positioning pawl 60.

The second elastic component 230 is sleeved on the shaft 180. Two opposite ends of the second elastic component 230 respectively press against the contact portion 112 of the bottom plate 11 and the pushed portion 1702 of the stopping pawl 170. The second elastic component 230 is configured to force the engagement portion 1701 of the stopping pawl 170 to move away from the first ratchet 32. The second elastic component 230 keeps the engagement portion 1701 of the stopping pawl 170 separating from the groove 321 of the first ratchet 32 when there is no additional force applying on the stopping pawl 170.

In this embodiment, the top plate 12 further includes a protrusion portion 122 protruding from the plate portion 121 of the top plate 12, and the protrusion portion 122 and the plate portion 121 are integrally formed into a single piece. In specific, the protrusion portion 122 includes a connection part 1221 and two positioning parts 1222. The connection part 1221 protrudes from the plate portion 121 of the top plate 12, and the positioning parts 1222 are connected to the plate portion 121 via the connection part 1221. The positioning parts 1222 are respectively located at two opposite ends of the connection part 1221 and extend towards two opposite directions. Each of the positioning parts 1222 is spaced apart from the plate portion 121.

The movable component 70 has a guide hole 71 and two recesses 72. The recesses 72 are connected to the guide hole 71 and extending in two opposite directions. The recesses 72 are respectively located at two opposite sides of the guide hole 71. The movable component 70 is linearly and movably located between the positioning parts 1222 and the plate portion 121, and the connection part 1221 of the protrusion portion 122 of the top plate 12 is located in the guide hole 71. In this embodiment, the recesses 72 are used for the installation of the movable component 70 onto the top plate 12. Specifically, to install the movable component 70 to the top plate 12, first step is to respectively align the recesses 72 of the movable component 70 with the positioning parts 1222 of the top plate 12, then is to respectively insert the positioning parts 1222 into the recesses 72, and then is to linearly move the movable component 70 with respect to the top plate 12 so as to move the positioning parts 1222 away from the recesses 72, by doing so, the movable component 70 is mounted on the top plate 12 and is prevented from falling off from the top plate 12. Note that the quantities of the positioning parts 1222 and the recesses 72 are not intended to limit the disclosure; in some other embodiments, each of them may be modified as one.

The movable component 70 further has a pushing portion 73 extending towards the bottom plate 11. The pushing portion 73 is in contact with the pushed portion 62 of the positioning pawl 60 and the pushed portion 1702 of the stopping pawl 170. In this embodiment, the second elastic component 220 is configured to force the pushed portion 62 of the positioning pawl 60 to move towards the pushing portion 73 of the movable component 70, and the second elastic component 230 is configured to force the pushed portion 1702 of the stopping pawl 170 to move towards the pushing portion 73 of the movable component 70. As such, the pushed portion 62 of the positioning pawl 60 and the pushed portion 73 of the stopping pawl 170 keep contacting the pushing portion 76 of the movable component 70 when there is no additional force applying on the positioning pawl 60 and the stopping pawl 170.

In this embodiment, the shift operating device 1 further includes a shaft 240 and a screw 250. The shaft 240 is inserted into the bottom plate 11, and the shaft 240 is partially located between the plate portion 121 of the top plate 12 and the bottom plate 11. The screw 250 is disposed through the plate portion 121 of the top plate 12 and screwed into the shaft 240. The downshift lever 80 is pivotably disposed on the plate portion 121 of the top plate 12 and the bottom plate 11 of the frame body 10 via the shaft 240, and the downshift lever 80 is in contact with the movable component 70.

Figure 6:
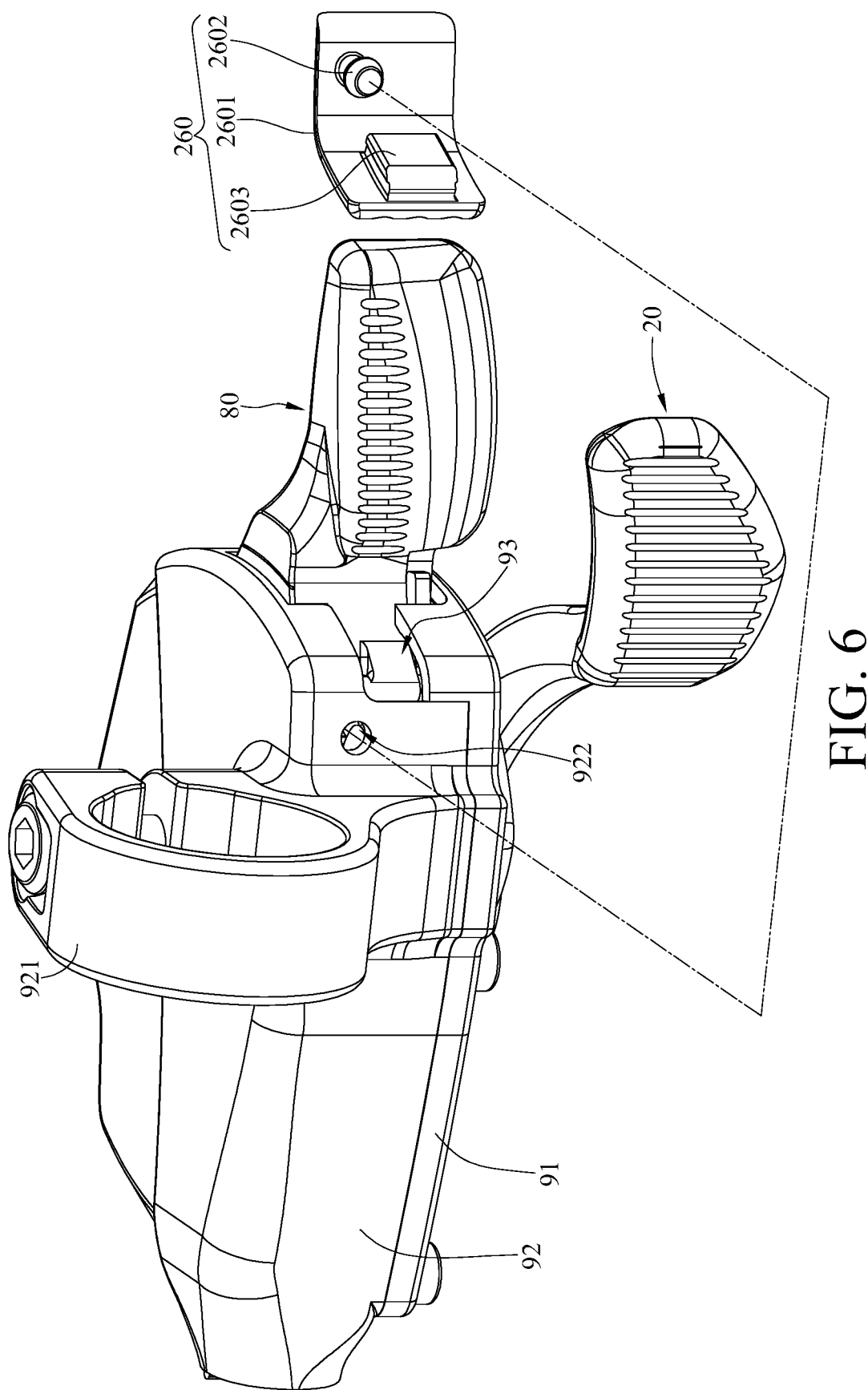
FIG. 6 is a partial exploded view of the shift operating device in FIG. 1.

Then, referring FIG. 6, there is shown a partial exploded view of the shift operating device 1. The upper part 92 and the bottom part 91 of the casing 90 together form a cable arrangement hole 93. The shift operating device 1 further includes a cover 260. The cover 260 is mounted on the casing 90 and covers the cable arrangement hole 93. In detail, the upper part 92 has a clamp ring portion 921 and an insertion hole 922. The clamp ring portion 921 of the upper part 92 is configured to be mounted on a bicycle handlebar (not shown). The insertion hole 922 and the cable arrangement hole 93 are located between the clamp ring portion 921 and the downshift lever 80. The cover 260 includes a plate portion 2601, a pillar portion 2602, and a protrusion portion 2603. The pillar portion 2602 and the protrusion portion 2603 are connected to the same surface of the plate portion 2601. The pillar portion 2602 and the protrusion portion 2603 are respectively inserted into the insertion hole 922 and the cable arrangement hole 93, and the plate portion 2601 covers the cable arrangement hole 93. As such, the cover 260 can prevent dust from entering into the accommodation space S of the casing 90 and affecting movements of the components in the accommodation space S of the casing 90. Note that the cover 260 of the shift operating device 1 is optional and may be omitted.

Figure 7:
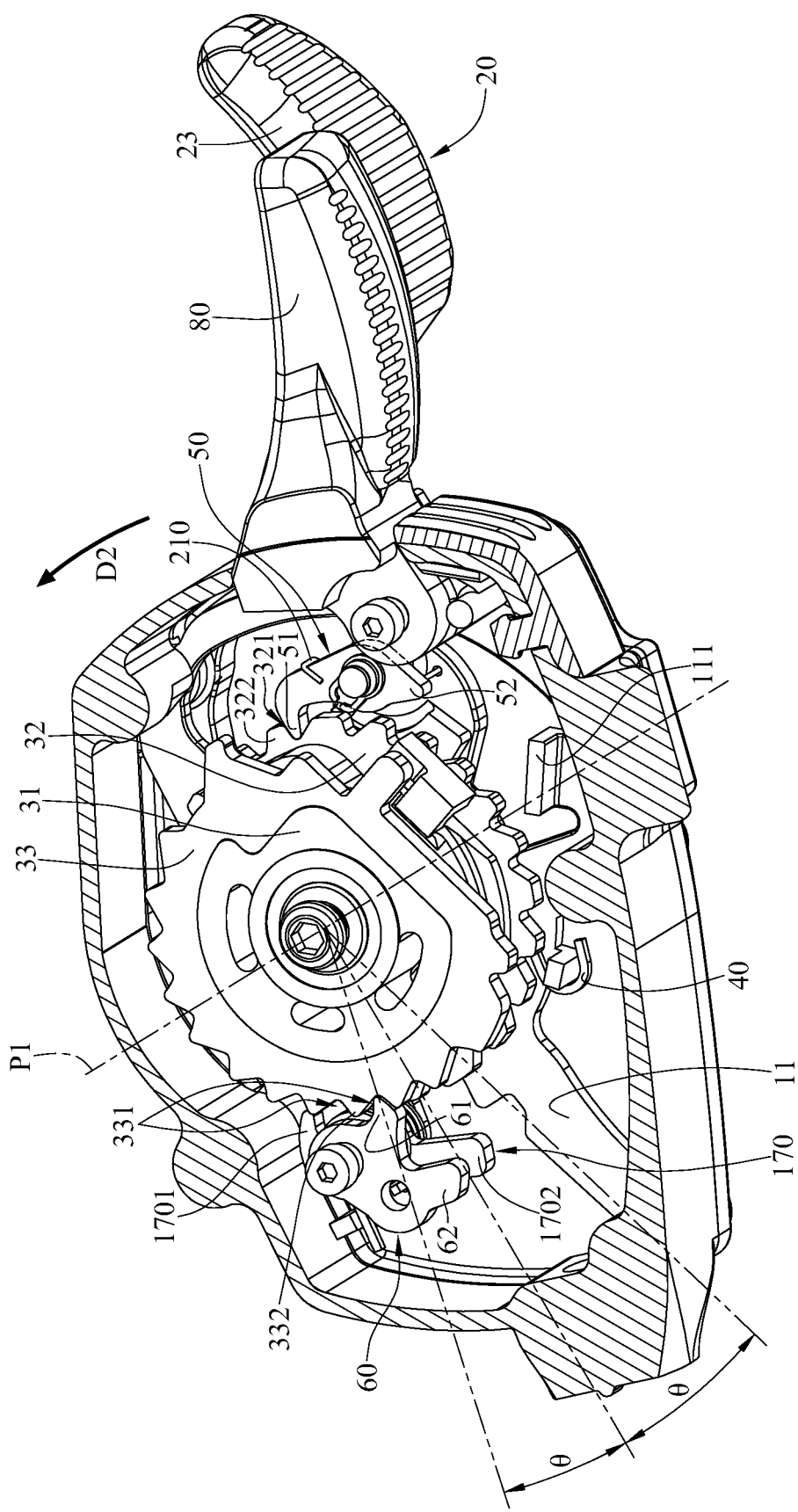
FIG. 7 is a cross-sectional view of the shift operating device in FIG. 5 when an upshift lever is pivoted in a second direction.
Figure 8:
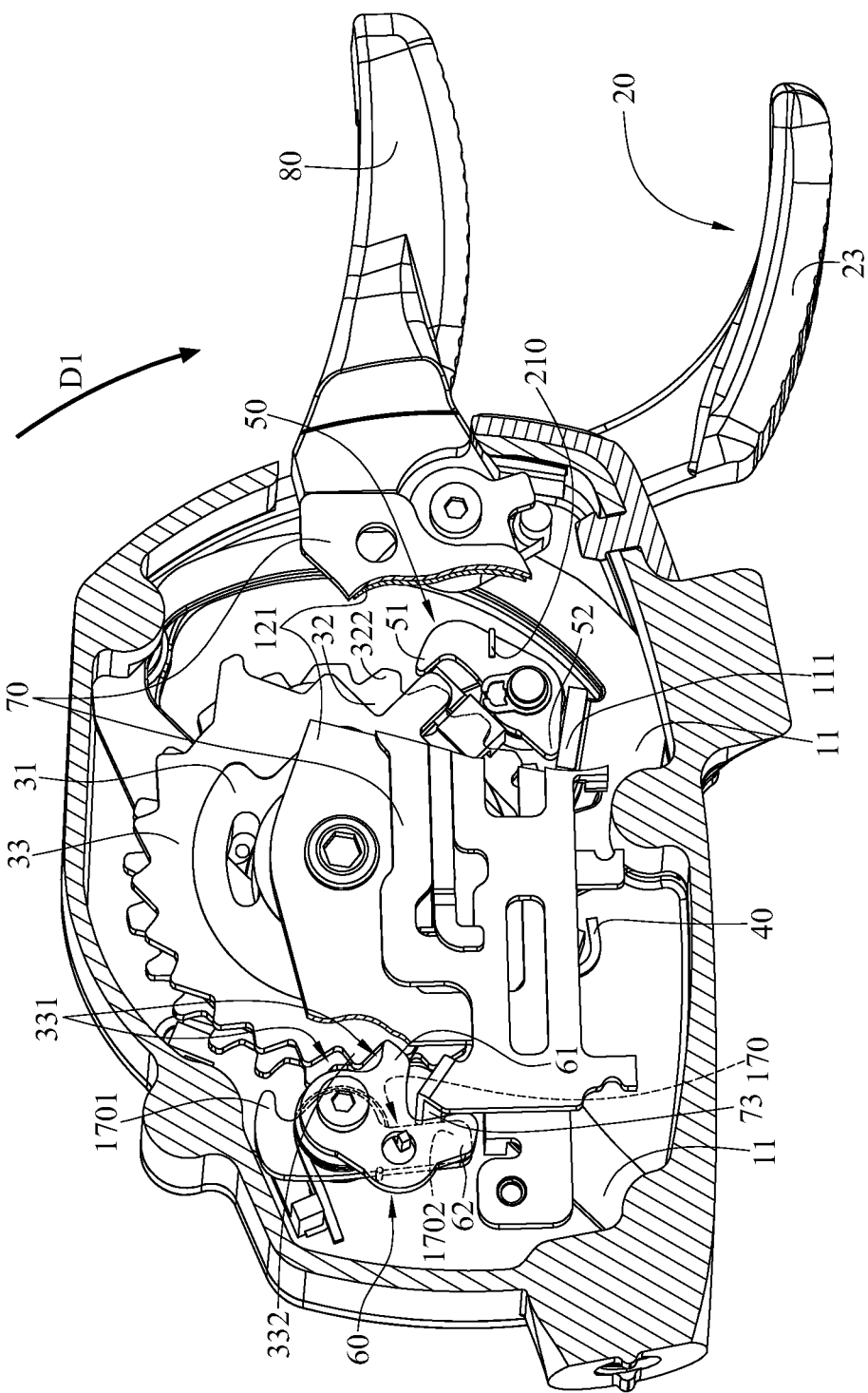
FIG. 8 is a cross-sectional view of the shift operating device in FIG. 7 when the upshift lever returns to its initial position.

Then, the upshift operation of the shift operating device 1 is explained hereinafter with reference to FIGS. 5, 7 and 8, where FIG. 7 is a cross-sectional view of the shift operating device 1 when the upshift lever 20 is pivoted in the second direction D2, and FIG. 8 is a cross-sectional view of the shift operating device 1 when the upshift lever 20 returns to its initial position.

As shown in FIGS. 5 and 7, the upshift lever 20 can be pivoted along the second direction D2 to perform the upshift operation. When the upshift lever 20 is pivoted in the second direction D2, the contact portion 52 of the driving pawl 50 is separated from the contact portion 111 of the bottom plate 11, and the second elastic component 210 forces the engagement portion 51 of the driving pawl 50 to move towards the first ratchet 32, such that the engagement portion 51 of the driving pawl 50 is engaged with the groove 321 of the first ratchet 32. When the upshift lever 20 is further pivoted in the second direction D2, the engagement portion 51 of the driving pawl 50 forces the first ratchet 32, the cable holder 31, and the second ratchet 33 to rotate along the second direction D2 because of the engagement between the engagement portion 51 of the driving pawl 50 and the grooves 321 of the first ratchet 32. As such, the rotation of the cable holder along the second direction D2 can pull bicycle cable to upshift the derailleur so as to switch the bicycle chain from one sprocket to another.

Figure 3:
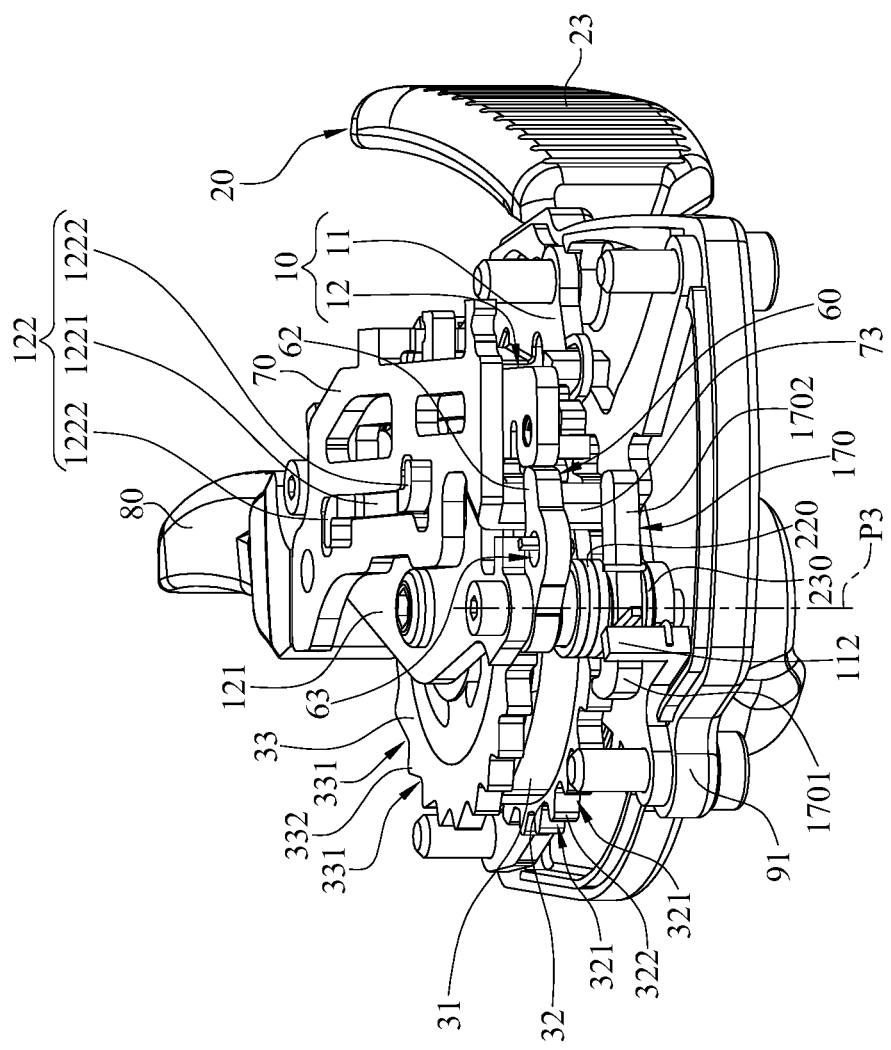
FIG. 3 is another perspective view of the shift operating device in FIG. 1 when the upper part of the casing and the cover are removed.

As shown in FIGS. 5 and 7, it is noted that, during the rotation of the first ratchet 32 along the second direction D2, the second elastic component 230 (as shown in FIG. 3) keeps the engagement portion 1701 of the stopping pawl 170 away from the first ratchet 32, such that the engagement portion 1701 is not engaged with the first ratchet 32 and therefore does not limit the rotation of the first ratchet 32. Also, during the rotation of the second ratchet 33 along the second direction D2, the inner surface of the groove 331 of the second ratchet 33 pushes the engagement portion 61 of the positioning pawl 60 away from the groove 331, such that the positioning pawl 60 does not limit the rotation of the second ratchet 33, either. In addition, during the rotation of the second ratchet 33 along the second direction D2, when the engagement portion 61 of the positioning pawl 60 is pushed away from the groove 331 and then climbs over the tooth 332 of the second ratchet 33, the second elastic component 220 (as shown in FIG. 3) forces the engagement portion 61 to enter into another groove 331 and hit the second ratchet 33 so as to generate a clicking sound. The user will know whether the upshift operation is successful by hearing the hitting sound, and the user will also know how many times (or gears) the derailleur shifts by counting the clicking sound.

It is understood that the larger angle the cable holder 31 is rotated, the more quantity of the sprockets the bicycle chain can cross in one time for achieving a rapid upshift. For example, as shown in FIGS. 5 and 7, the pivoting angle of the upshift lever 20 along the second direction D2 can cause the engagement portion 61 of the positioning pawl 60 to across two teeth 332 of the second ratchet 33 to enter into another groove 331; that is, the second ratchet 33 can be rotated by two angles θ so as to upshift the derailleur two gears. In this embodiment, one pivoting of the upshift lever 20 may cause the derailleur to upshift four gears in maximum, but the disclosure is not limited thereto. For example, the maximum gears of the upshift of the derailleur caused by pivoting the upshift lever 20 one time may be modified by adjusting the maximum pivotable angle of the upshift lever 20 or the arrangements of the pawl and the ratchet.

Figure 4:
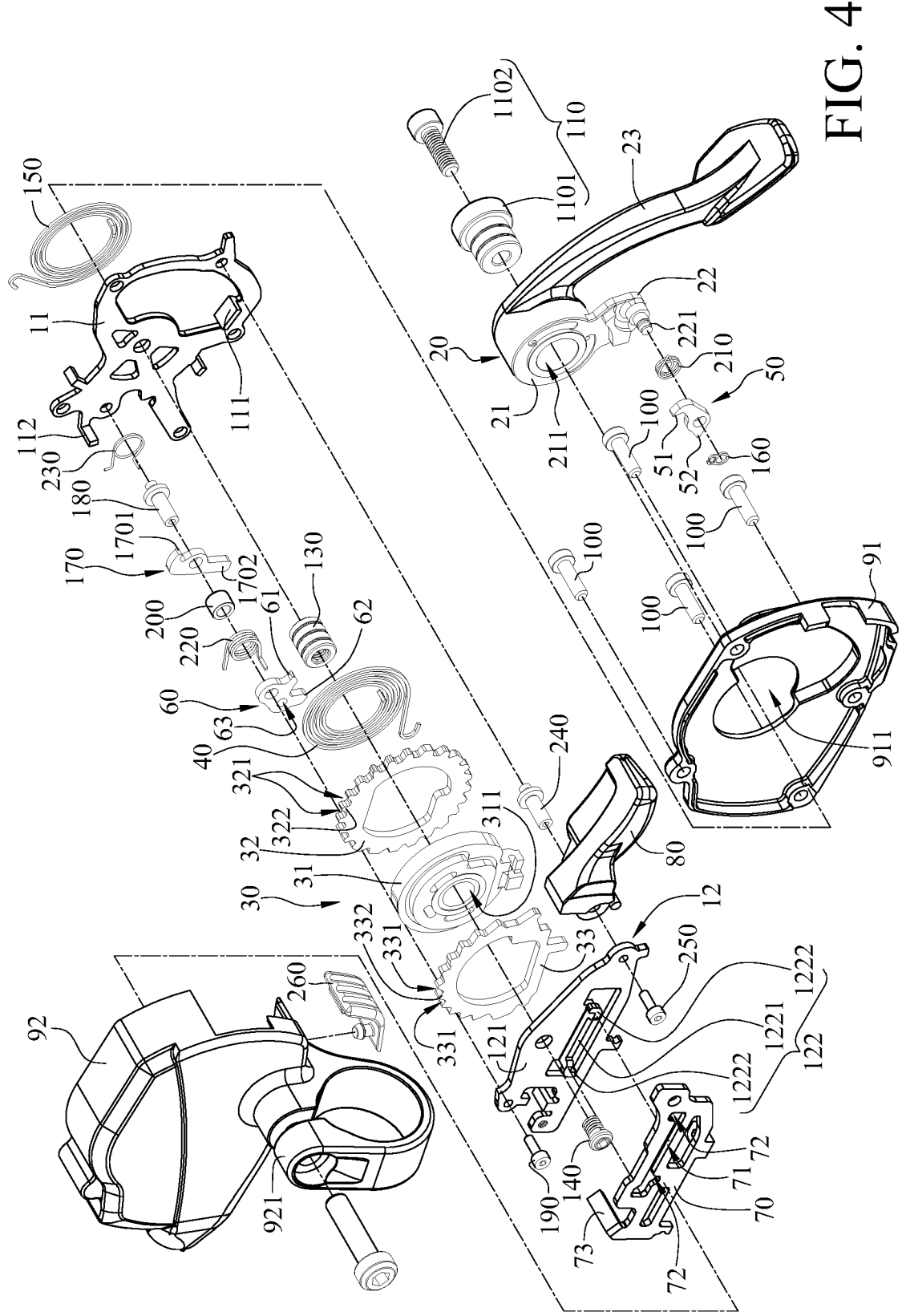
FIG. 4 is an exploded view of the shift operating device in FIG. 1.

As shown in FIG. 8, when the upshift lever 20 is released, the second elastic component 150 (as shown in FIG. 4) is able to spring the upshift lever 20 and the driving pawl 50 back to their original positions along the first direction D1. It is noted that the first elastic component 40 also provides the force on the second ratchet 33 along the first direction D1, but the second ratchet 33 is unable to be rotated along the first direction D1 due to the engagement between the engagement portion 61 of the positioning pawl 60 and the tooth 332 of the second ratchet 33, such that the second ratchet 33 is fixed at the current position, and the first ratchet 32 and the cable holder 31 (as shown in FIG. 8) are also kept in the current positions by the second ratchet 33. Regarding the driving pawl 50, the inner surface of the groove 321 of the first ratchet 32 does not limit the movement of the engagement portion 51 along the first direction D1, such that the engagement portion 51 can be moved along with the upshift lever 20 to across the teeth 322 of the first ratchet 32, and when the contact portion 52 contacts the contact portion 111 of the bottom plate 11, the upshift lever 20 is stopped in its original position, and the engagement portion 51 of the driving pawl 50 is separated from the first ratchet 32.

Figure 9:
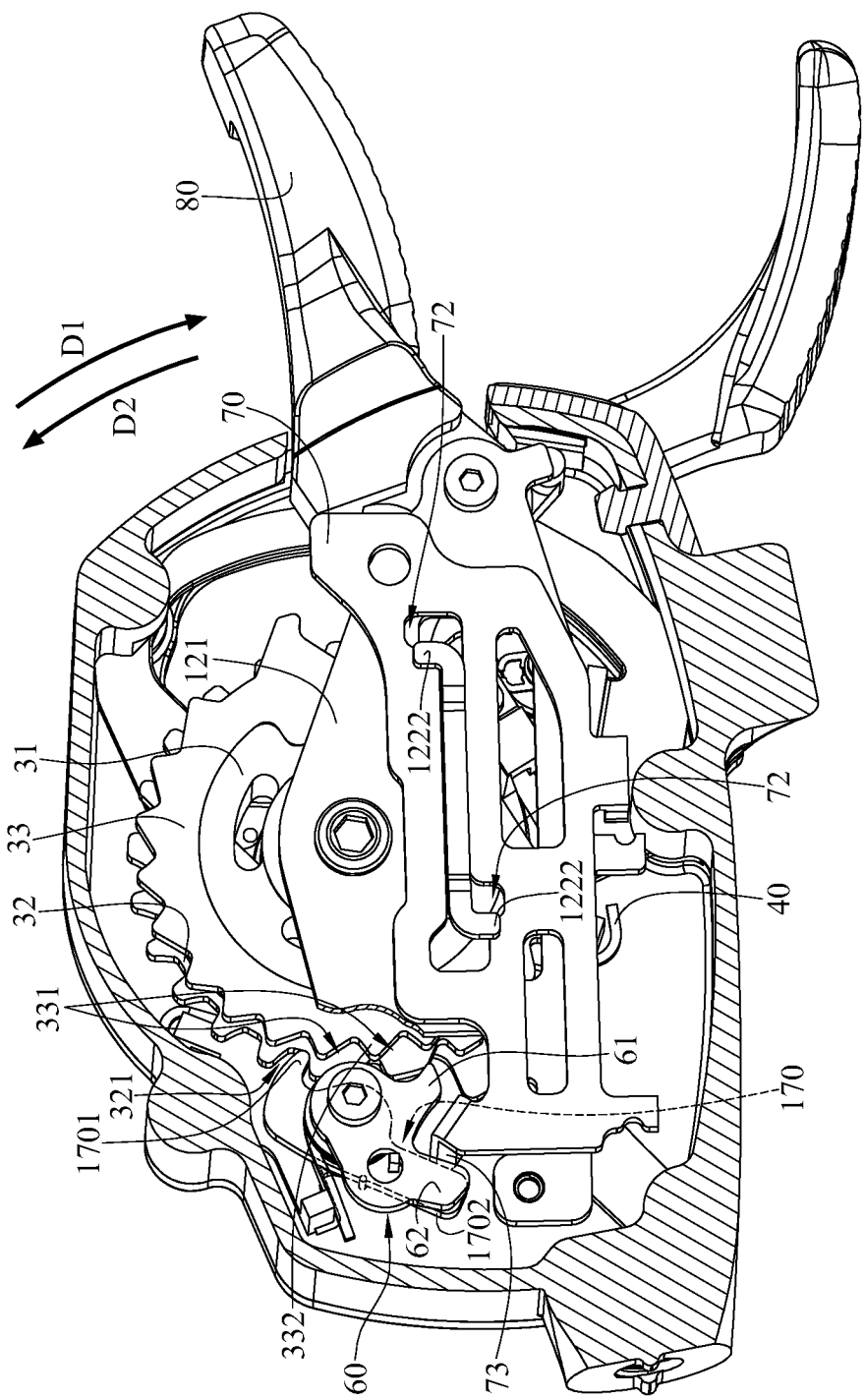
FIG. 9 is a cross-sectional view of the shift operating device in FIG. 8 when a downshift lever is pivoted to a downshift position from an initial position.
Figure 10:
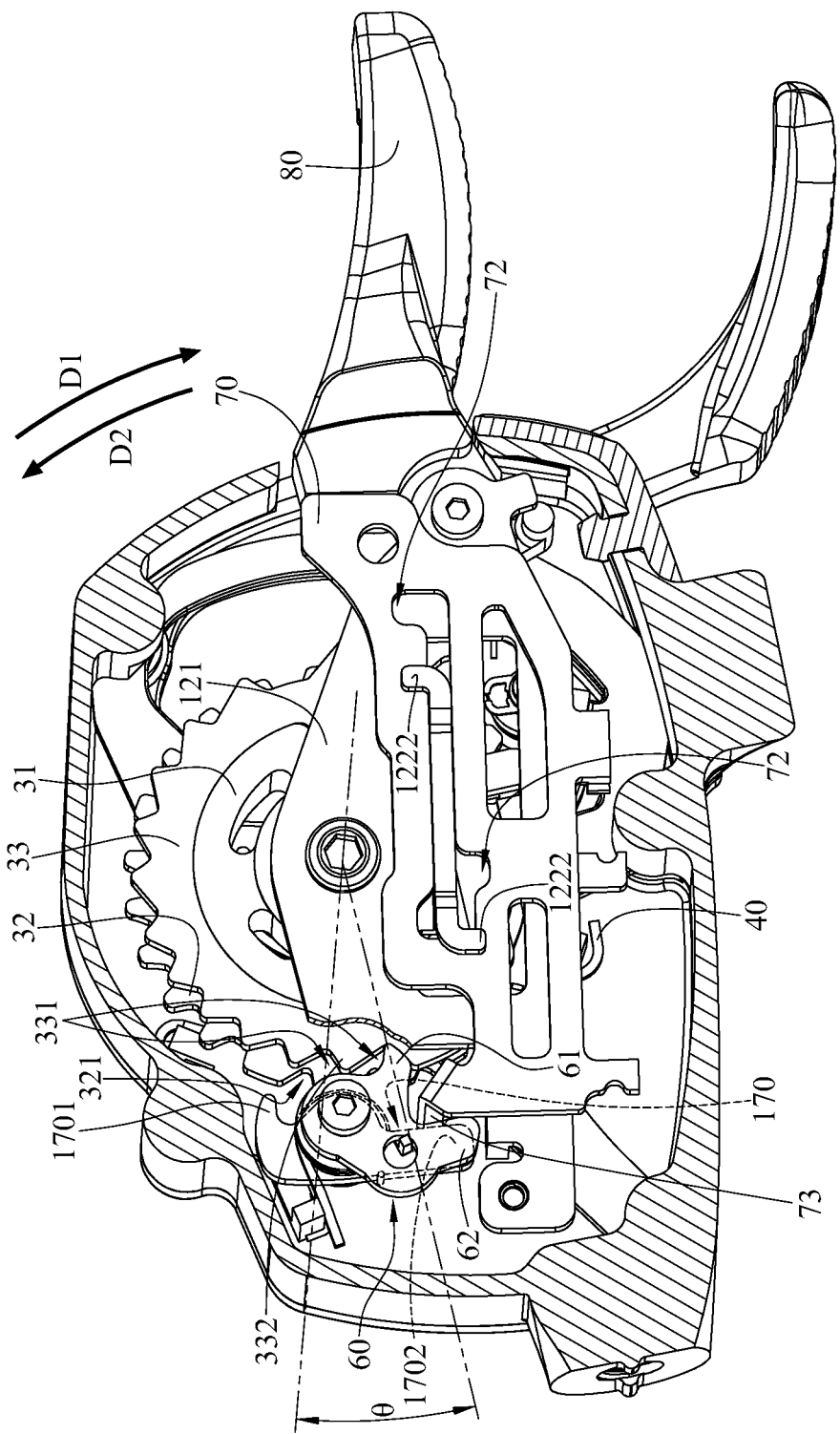
FIG. 10 is a cross-sectional view of the shift operating device in FIG. 9 when the downshift lever returns to the initial position from the downshift position.

Then, the downshift operation of the shift operating device 1 is explained hereinafter with reference to FIGS. 9 and 10, where FIG. 9 is a cross-sectional view of the shift operating device 1 when the downshift lever 80 is pivoted to a downshift position from an initial position, and FIG. 10 is a cross-sectional view of the shift operating device 1 when the downshift lever 80 returns to the initial position from the downshift position.

As shown in FIGS. 9 and 10, the downshift lever 80 can be pivoted from an initial position to the downshift position along the second direction D2 by hand so as to downshift the derailleur. And when the downshift lever 80 is released by hand, it returns to the initial position automatically.

Specifically, as shown in FIG. 9, during the movement of the downshift lever 80 from the initial position to the downshift position along the second direction D2, the downshift lever 80 pushes the movable component 70 to cause the pushing portion 73 of the movable component 70 to push the pushed portion 62 of the positioning pawl 60 and the pushed portion 1702 of the stopping pawl 170, such that the engagement portion 61 of the positioning pawl 60 is removed from the groove 331 of the second ratchet 33, and the engagement portion 1701 of the stopping pawl 170 is immediately entering into the groove 321 of the first ratchet 32. Therefore, the second ratchet 33, the cable holder 31, and the first ratchet 32 are merely rotated by a first angle along the first direction D1 by the first elastic component 40 and then is stopped by the stopping pawl 170.

During the movement of the downshift lever 80 from the initial position to the downshift position along the second direction D2, the positioning parts 1222 are misaligned with the recesses 72, such that the movement of the movable component 70 caused by the downshift lever 80 will not cause the movable component 70 to fall off from the top plate 12.

Then, as shown in FIG. 10, when the downshift lever 80 is released, the pushing portion 73 of the movable component 70 no longer presses against the pushed portion 62 of the positioning pawl 60 and the pushed portion 1702 of the stopping pawl 170, such that the second elastic components 220 and 230 (as shown in FIG. 3) forces the pushed portion 62 of the positioning pawl 60 and the pushed portion 1702 of the stopping pawl 170 to push the movable component 70 to move the downshift lever 80 from the downshift position to the initial position. Also, the second elastic component 230 forces the engagement portion 1701 of the stopping pawl 170 to remove from the groove 321 of the first ratchet 32, and the second elastic component 220 forces the engagement portion 61 of the positioning pawl 60 to enter into another groove 331 of the second ratchet 33, such that the first elastic component 40 forces the second ratchet 33, the cable holder 31, and the first ratchet 32 to rotate by a second angle along the first direction D1, and then the second ratchet 33, the cable holder 31, and the first ratchet 32 are immediately stopped by the positioning pawl 60. At this moment, the downshift of the shift operating device 1 is finished. During the downshifting, the second ratchet 33 has been rotated by one angle θ that is the sum of the first angle and the second angle; that is, as shown in FIGS. 9 and 10, the engagement portion 61 of the positioning pawl 60 is engaged with another groove 331 that is next to the groove 331 where the engagement portion 61 is engaged before the downshift lever 80 is pivoted. Therefore, it can be understood that pivoting the downshift lever 80 one time can merely downshift the derailleur one gear.

According to the shift operating device as discussed in the above embodiment, the movable component can be linearly moved relative to the frame body and in contact with the positioning pawl, and the downshift lever is pivotably disposed on the frame body and in contact with the movable component, such that, when the downshift lever is being activated, the movable component moves the positioning pawl away from the cable spool assembly, causing the cable spool assembly to rotate along the first direction so as to downshift the derailleur. Therefore, the relationship among the downshift lever and other components moved along with the downshift lever is simplified, thereby reducing the cost of the shift operating device.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A shift operating device, configured to be mounted on a handlebar and to pull a bicycle cable, comprising:
   a frame body;
   a cable spool assembly, rotatably disposed on the frame body, wherein the cable spool assembly is configured for the bicycle cable to wind thereon;
   a first elastic component, disposed on the cable spool assembly, wherein the first elastic component is configured to force the cable spool assembly to rotate along a first direction;
   an upshift lever, pivotably disposed on the frame body;
   a driving pawl, pivotably disposed on the upshift lever; wherein when the upshift lever is pivoted, the upshift lever forces the cable spool assembly to rotate along a second direction opposite to the first direction via the driving pawl;
   a positioning pawl, pivotably disposed on the frame body, wherein the positioning pawl is removably engaged with the cable spool assembly;
   a movable component, linearly and movably disposed on the frame body, wherein the movable component is in contact with the positioning pawl; and
   a downshift lever, pivotably disposed on the frame body and in contact with the movable component; wherein when the downshift lever is pivoted, the downshift lever forces the movable component to detach the positioning pawl from the cable spool assembly so as to force the first elastic component to rotate the cable spool assembly along the first direction.

2. The shift operating device according to claim 1, wherein when the upshift lever is not pivoted, the driving pawl is separated from the cable spool assembly; when the upshift lever is pivoted, the upshift lever drives the driving pawl to engage with the cable spool assembly.

3. The shift operating device according to claim 2, wherein the frame body has a contact portion; when the upshift lever is not pivoted, the driving pawl is in contact with the contact portion so as to separate the driving pawl from the cable spool assembly; when the upshift lever is pivoted, the driving pawl is separated from the contact portion.

4. The shift operating device according to claim 3, further comprising a second elastic component, wherein the second elastic component is disposed on the driving pawl, and the second elastic component is configured to force an engagement portion of the driving pawl to move towards the cable spool assembly.

5. The shift operating device according to claim 1, wherein the frame body comprises a bottom plate and a top plate, the bottom plate and the top plate are spaced apart from each other, the cable spool assembly and the positioning pawl are located between the bottom plate and the top plate, the movable component is movably disposed on the top plate, and the downshift lever is pivotably disposed on the bottom plate and the top plate.

6. The shift operating device according to claim 5, wherein the top plate comprises a plate portion and a protrusion portion protruding from the plate portion, the movable component has a guide hole, the protrusion portion of the top plate is disposed through the guide hole of the movable component, and the movable component is linearly movable relative to the plate portion.

7. The shift operating device according to claim 6, wherein the protrusion portion comprises a connection part and at least one positioning part, the at least one positioning part is connected to the plate portion via the connection part, the at least one positioning part is spaced apart from the plate portion, the connection part is located in the guide hole of the movable component, and the movable component is movably located between the at least one positioning part and the plate portion.

8. The shift operating device according to claim 7, wherein the movable component has at least one recess connected to the guide hole; when the downshift lever is pivoted, the at least one positioning part and the at least one recess are misaligned with each other.

9. The shift operating device according to claim 6, wherein the protrusion portion and the plate portion are integrally formed into a single piece.

10. The shift operating device according to claim 1, further comprising a casing and a cover, wherein the cable spool assembly, the first elastic component, the driving pawl, the positioning pawl, and the movable component are located in the casing, the casing has a clamp ring portion and a cable arrangement hole, the clamp ring portion is configured to clamp the handlebar, the cable arrangement hole is located between the downshift lever and the clamp ring portion, and the cover is removably mounted on the casing and covers the cable arrangement hole.

11. The shift operating device according to claim 10, wherein the cover includes a plate portion and a protrusion portion connected to each other, the protrusion portion is inserted into the cable arrangement hole, and the plate portion covers the cable arrangement hole.

12. The shift operating device according to claim 10, wherein the cover comprises a plate portion and a pillar portion connected to each other, the casing further has an insertion hole spaced apart from the cable arrangement hole, and the pillar portion is inserted into the insertion hole, and the plate portion covers the cable arrangement hole.

13. The shift operating device according to claim 1, further comprising a stopping pawl, wherein the stopping pawl is pivotably disposed on the frame body; during a pivoting movement of the downshift lever, the downshift lever is moved from an initial position to a downshift position and then return to the initial position; when the downshift lever is moved from the initial position to the downshift position, the downshift lever forces the positioning pawl to detach from the cable spool assembly via the movable component and forces the stopping pawl to engage with the cable spool assembly via the movable component so that the cable spool assembly is rotated by a first angle along the first direction and then is stopped by the stopping pawl; when the downshift lever returns to the initial position form the downshift position, the stopping pawl is detached from the cable spool assembly, and the positioning pawl is engaged with the cable spool assembly so that the cable spool assembly is rotated by a second angle along the first direction and then is stopped by the positioning pawl.

14. The shift operating device according to claim 13, wherein the cable spool assembly has a plurality of grooves, there is an angle formed between two lines that respectively connects bottoms of two of the plurality of grooves which are adjacent to each other with a rotation axis of the cable spool assembly, and a sum of the first angle and the second angle is substantially equal to the angle.

15. The shift operating device according to claim 13, further comprising a second elastic component, wherein the second elastic component is disposed on the stopping pawl, and the second elastic component is configured to force an engagement portion of the stopping pawl to move away from the cable spool assembly.

16. The shift operating device according to claim 1, further comprising a second elastic component, wherein the second elastic component is disposed on the positioning pawl, and the second elastic component is configured to force an engagement portion of the positioning pawl to move towards the cable spool assembly.

\* \* \* \* \*